United States Patent
Hung et al.

(10) Patent No.: US 7,630,192 B2
(45) Date of Patent: Dec. 8, 2009

(54) UNIVERSAL TYPE KEYBOARD

(75) Inventors: Chin-Hao Hung, Sijhih (TW); Tien-Hao Yang, Sijhih (TW)

(73) Assignee: Behavior Tech Computer Corp., Taipei County (TW)

( * ) Notice: Subject to any disclaimer, the term of this patent is extended or adjusted under 35 U.S.C. 154(b) by 143 days.

(21) Appl. No.: 12/007,119

(22) Filed: Jan. 7, 2008

(65) Prior Publication Data
US 2009/0002925 A1 Jan. 1, 2009

(30) Foreign Application Priority Data
Jun. 27, 2007  (TW) .............................. 96210486 U

(51) Int. Cl.
*G06F 1/16* (2006.01)
(52) U.S. Cl. .................... 361/679.08; 400/82
(58) Field of Classification Search ............ 361/679.08; 400/82
See application file for complete search history.

(56) References Cited

U.S. PATENT DOCUMENTS

| | | | |
|---|---|---|---|
| 5,387,042 A * | 2/1995 | Brown ........................ | 400/477 |
| 5,510,953 A * | 4/1996 | Merkel ................... | 361/679.08 |
| 6,104,604 A * | 8/2000 | Anderson et al. ....... | 361/679.55 |
| 6,685,369 B2 * | 2/2004 | Lien ........................... | 400/472 |
| 6,965,076 B2 * | 11/2005 | Wu ............................ | 174/541 |
| 2004/0085716 A1 * | 5/2004 | Uke ........................... | 361/680 |
| 2006/0007157 A1 * | 1/2006 | Li et al. ..................... | 345/168 |
| 2007/0146976 A1 * | 6/2007 | Lin ............................ | 361/680 |
| 2008/0007902 A1 * | 1/2008 | Kim .......................... | 361/680 |

* cited by examiner

*Primary Examiner*—Lisa Lea-Edmonds
(74) *Attorney, Agent, or Firm*—Muncy, Geissler, Olds & Lowe, PLLC

(57) ABSTRACT

A universal type keyboard has a common design of an upper housing and key caps for different languages such that keyboards of different languages can be manufactured with a universal upper housing.

14 Claims, 9 Drawing Sheets

UNIVERSAL TYPE KEYBOARD

RELATED APPLICATIONS

This application claims priority to Taiwan Application Serial Number 96210486, filed Jun. 27, 2007, which is herein incorporated by reference.

BACKGROUND

1. Field of Invention

The present invention relates to a computer keyboard.

2. Description of Related Art

In a conventional keyboard manufacturing practice, different designs of an upper housing are created for computer keyboards of different languages (such as Japanese or American). In particular, the upper housing is equipped with key holes of different sizes or different arrangements for computer keyboards of different languages.

For the forgoing reasons, different language keyboards needs a universal upper housing, thereby reducing manufacturing costs for the computer keyboard.

SUMMARY

It is therefore an objective of the present invention to provide a universal keyboard.

In accordance with the foregoing and other objectives of the present invention, a universal keyboard is provided. A major keypad area is disposed on the upper housing, wherein the major keypad area has a key hole row with the following features. A space key hole is for installing a space key. A first and second special key holes are respectively disposed at two opposite sides of the space key hole. A first assist hole is disposed between the space key hole and the first special key hole. A second assist hole is disposed between the space key hole and the second special key hole.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
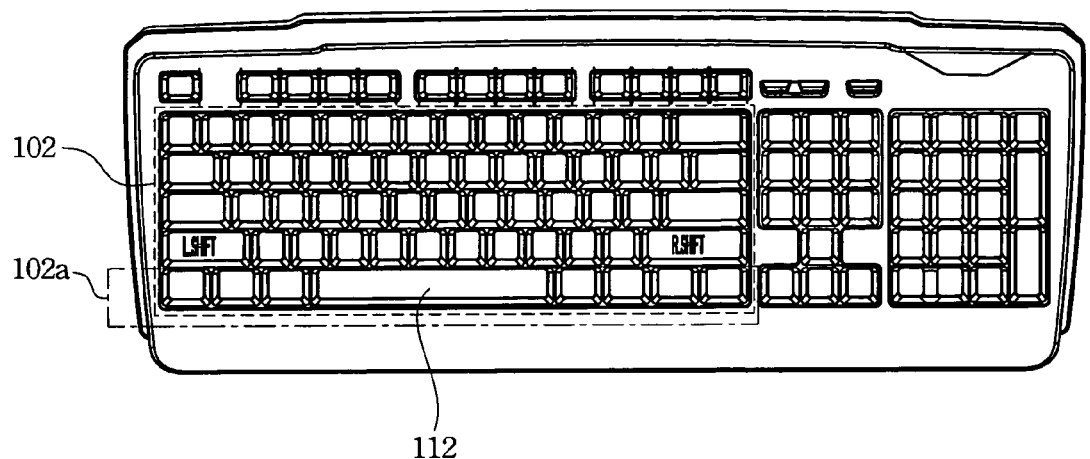
FIG. 1 illustrates a top view of an American keyboard.

Reference will now be made in detail to the present preferred embodiments of the invention, examples of which are illustrated in the accompanying drawings. Wherever possible, the same reference numbers are used in the drawings and the description to refer to the same or like parts.

Figure 2:
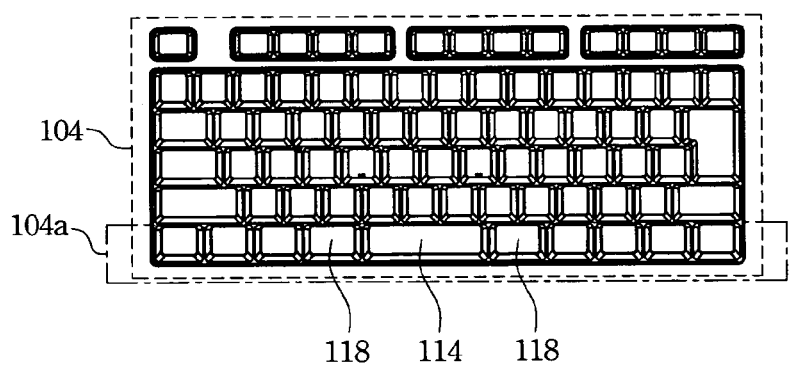
FIG. 2 illustrates a top view of a major keypad area of a Japanese keyboard.
Figure 3:
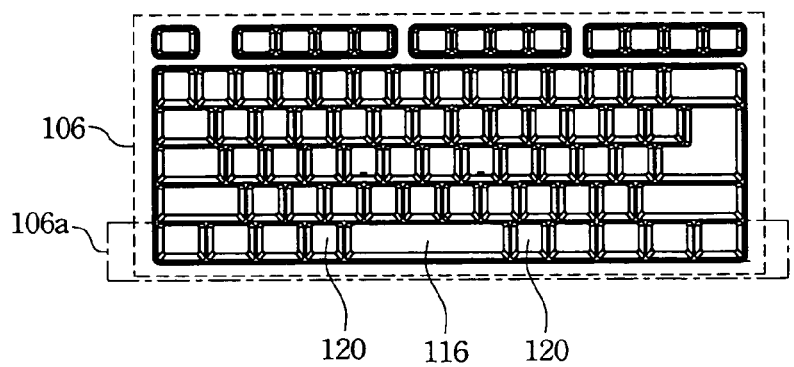
FIG. 3 illustrates a top view of a major keypad area of a Korean keyboard.

FIG. 1 illustrates a top view of an American keyboard. FIG. 2 illustrates a top view of a major keypad area of a Japanese keyboard. FIG. 3 illustrates a top view of a major keypad area of a Korean keyboard.

The embodiment discussed below provides a universal upper housing and key caps to at least satisfy keyboards as illustrated in FIGS. 1-3. This embodiment focuses on how a key row 102a of the American keyboard, a key row 104a of the Japanese keyboard and a key row 106a of the Korean keyboard share a common universal upper housing. Other key rows of a major keypad area 102 of the American keyboard, a major keypad area 104 of the Japanese keyboard and a major keypad area 106 of the Korean keyboard already have a common design on the upper housing. As illustrated in FIGS. 1~3, the major differences among the key row 102a, the key row 104a and the key row 106a are the space keys and their adjacent keys. How the universal upper housing and key caps be designed to form a universal keyboard is described below.

Figure 4A:
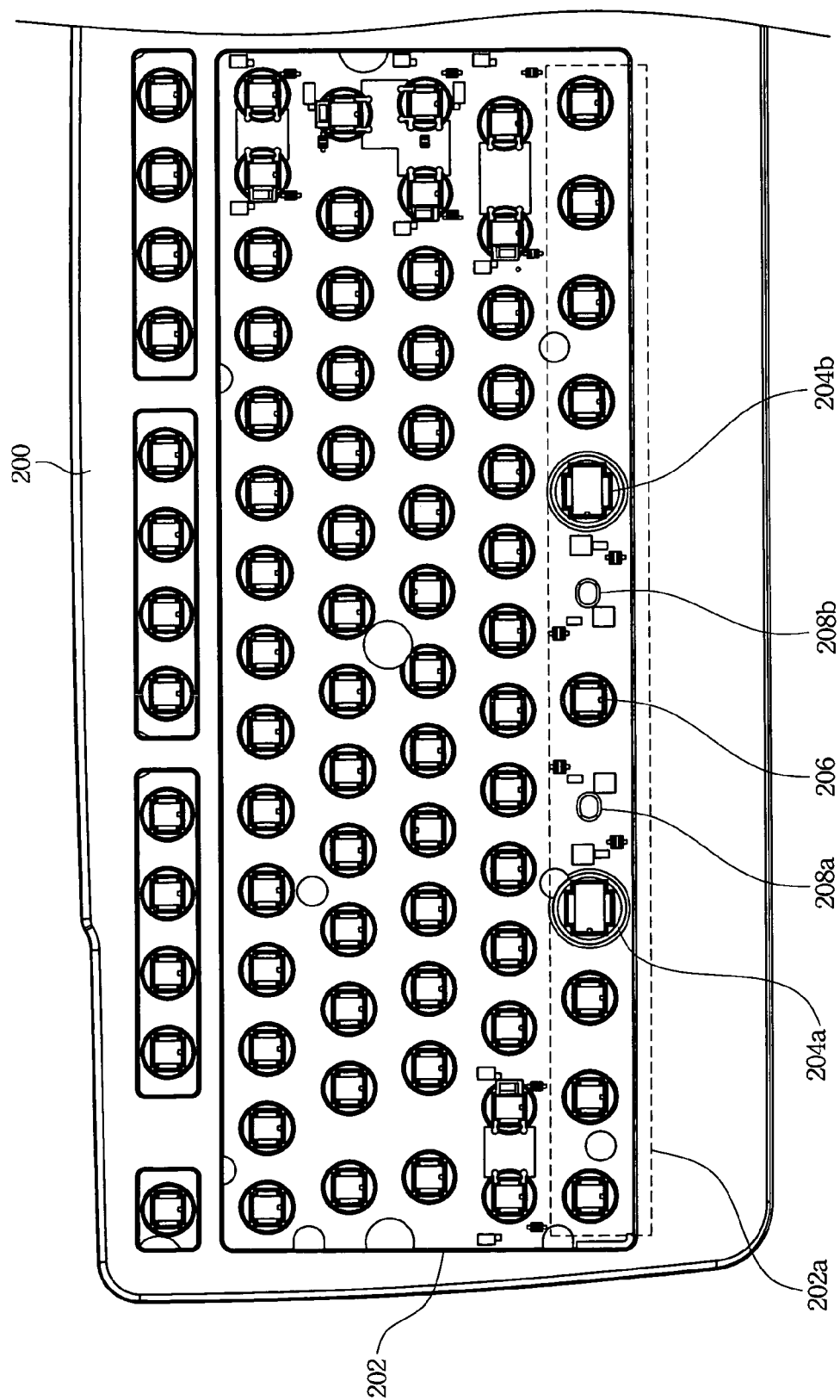
FIG. 4A illustrates a top view of an upper housing of a universal keyboard.

FIG. 4A illustrates a top view of an upper housing of a universal keyboard. A major keypad area 202 of the universal upper housing 200 has a plurality of key holes, wherein a key hole row 202a has been redesigned. The key hole row 202a includes a space key hole 206, which has the same diameter as other standard key holes (the key holes not located in the key hole row 202a) does. A pair of assist holes 208a/208b are located on two opposite sides of the space key hole 206 along the key hole row 202a. The assist holes 208a/208b are of smaller hole size or smaller diameter compared to the other standard key holes or the space key hole 206. A pair of special key holes 204a/204b are also located on two opposite sides of the space key hole 206 along the key hole row 202a. The special key holes 204a/204b are of larger hole size or larger diameter compared to the other standard key holes or the space key hole 206. The assist hole 208a is located between the space key hole 206 and the special key hole 204a. The assist hole 208b is located between the space key hole 206 and the special key hole 204b.

The following paragraphs are to describe that how American, Japanese and Korean key caps are designed to be installed on the key hole row 202a of the universal upper housing 200.

Figure 4B:
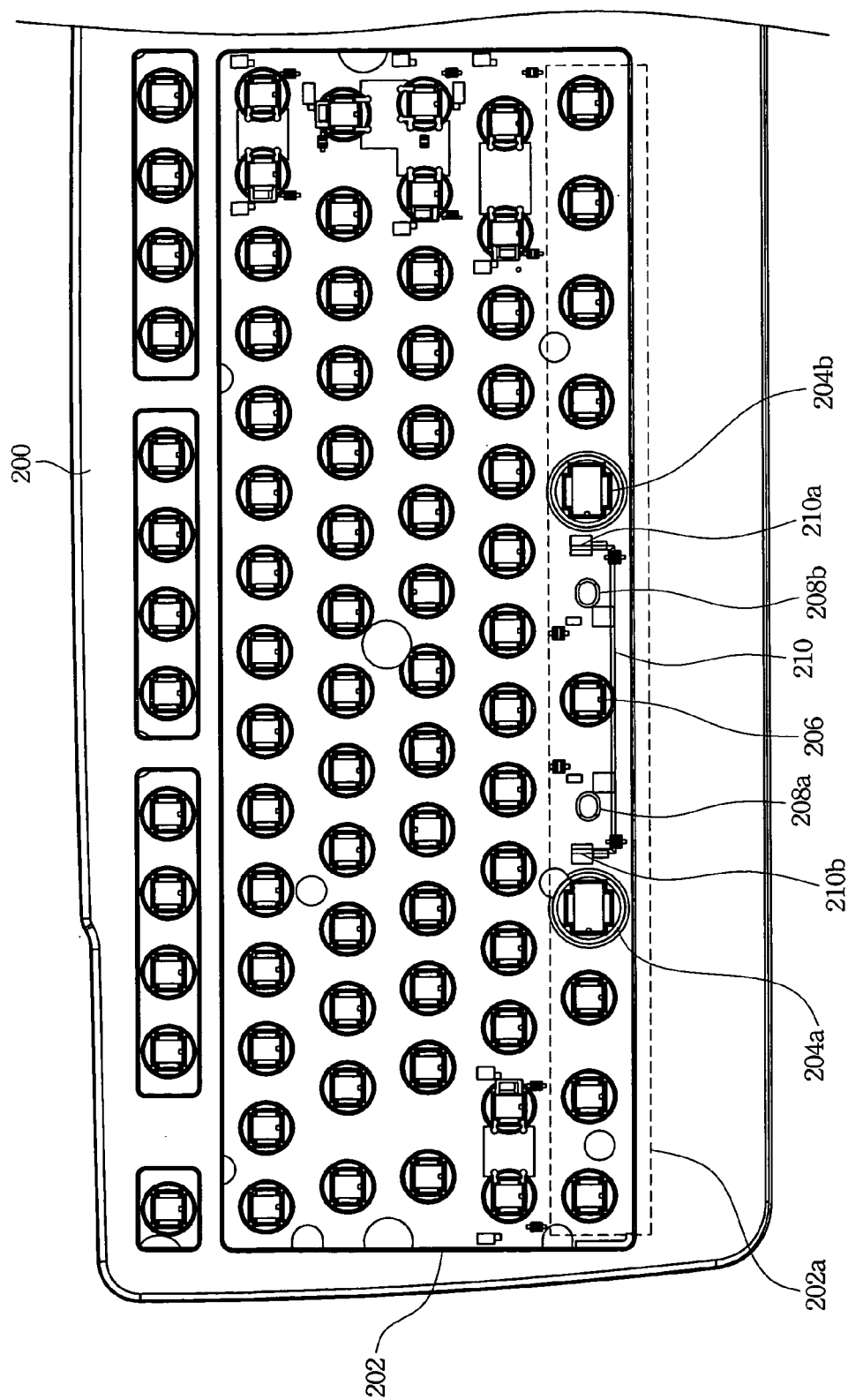
FIG. 4B illustrates a top view of an upper housing of a universal keyboard (an American and Korean balance rod is added)
Figure 5:
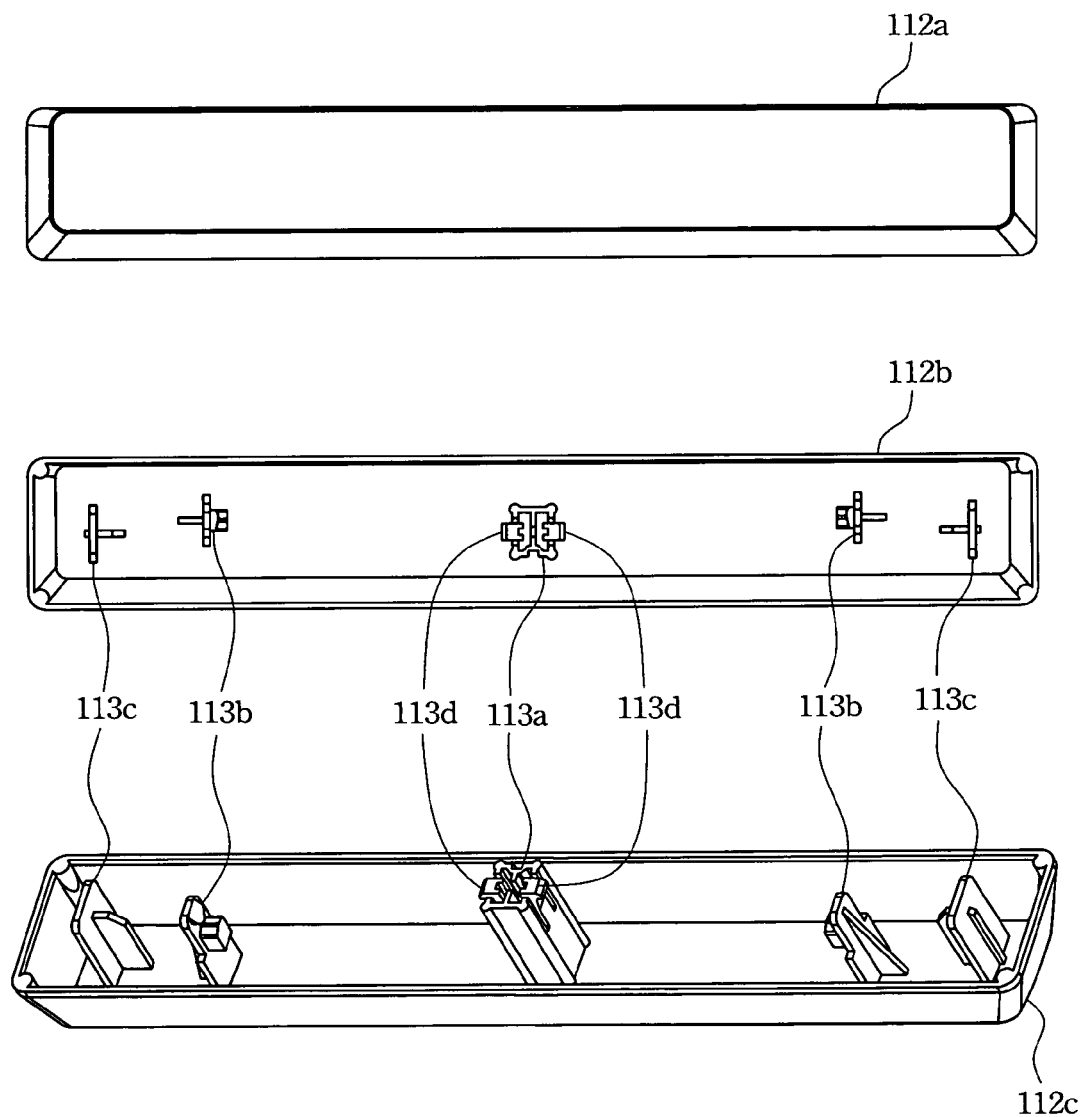
FIG. 5 illustrates an American space key cap of a universal keyboard.

Please refer to FIG. 1, FIG. 4B and FIG. 5, which illustrates how American key caps are designed to be installed on the key hole row 202a of the universal upper housing 200. FIG. 4B illustrates a top view of the upper housing 200, where a balance rod 210 is added. FIG. 5 illustrates a top view 112a, a bottom view 112b and a side view 112c of the American space key cap 112.

Referring to FIG. 5, the American space key cap 112 has a main positioning pin 113a, a pair of balance rod hooks 113b and a pair of assist positioning pins 113c on its bottom surface. The main positioning pin 113a is located on a central area of the bottom surface. The pair of balance rod hooks 113b are symmetrically located at two opposite sides of the main positioning pin 113a. The pair of T-shaped assist positioning pins 113c are also symmetrically located at two opposite sides of the main positioning pin 113a.

Please refer to FIG. 4B and FIG. 5. When the American space key cap 112 is installed on the key hole row 202a of the universal upper housing 200, the main positioning pin 113a is inserted into the space key hole 206, the pair of assist positioning pins 113c are respectively inserted into the special key holes 204a/204b, and the pair of balance rod hooks 113b respectively engage with two end portions 210a/210b of the balance rod 210. After the main positioning pin 113a is inserted into the space key hole 206, a pair of hooks 113d engage with an inner wall of the space key hole 206 to secure the American space key cap 112 to the universal upper housing 200. The balance rod 210 and the pair of assist positioning pins 113c both result in a balanced action of the American space key cap 112 pressed by a user.

Figure 4C:
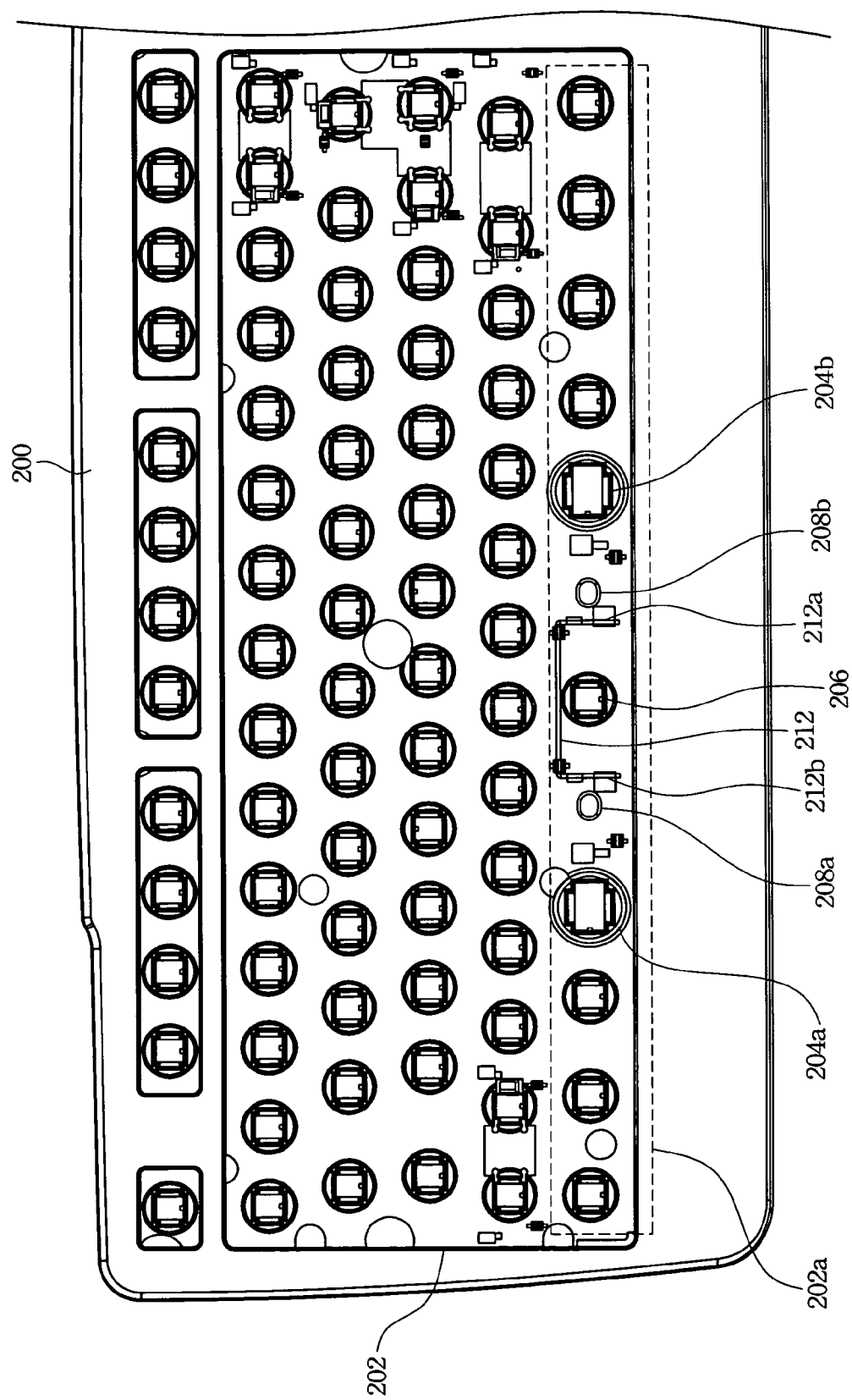
FIG. 4C illustrates a top view of an upper housing of a universal keyboard (a Japanese balance rod is added)
Figure 6:
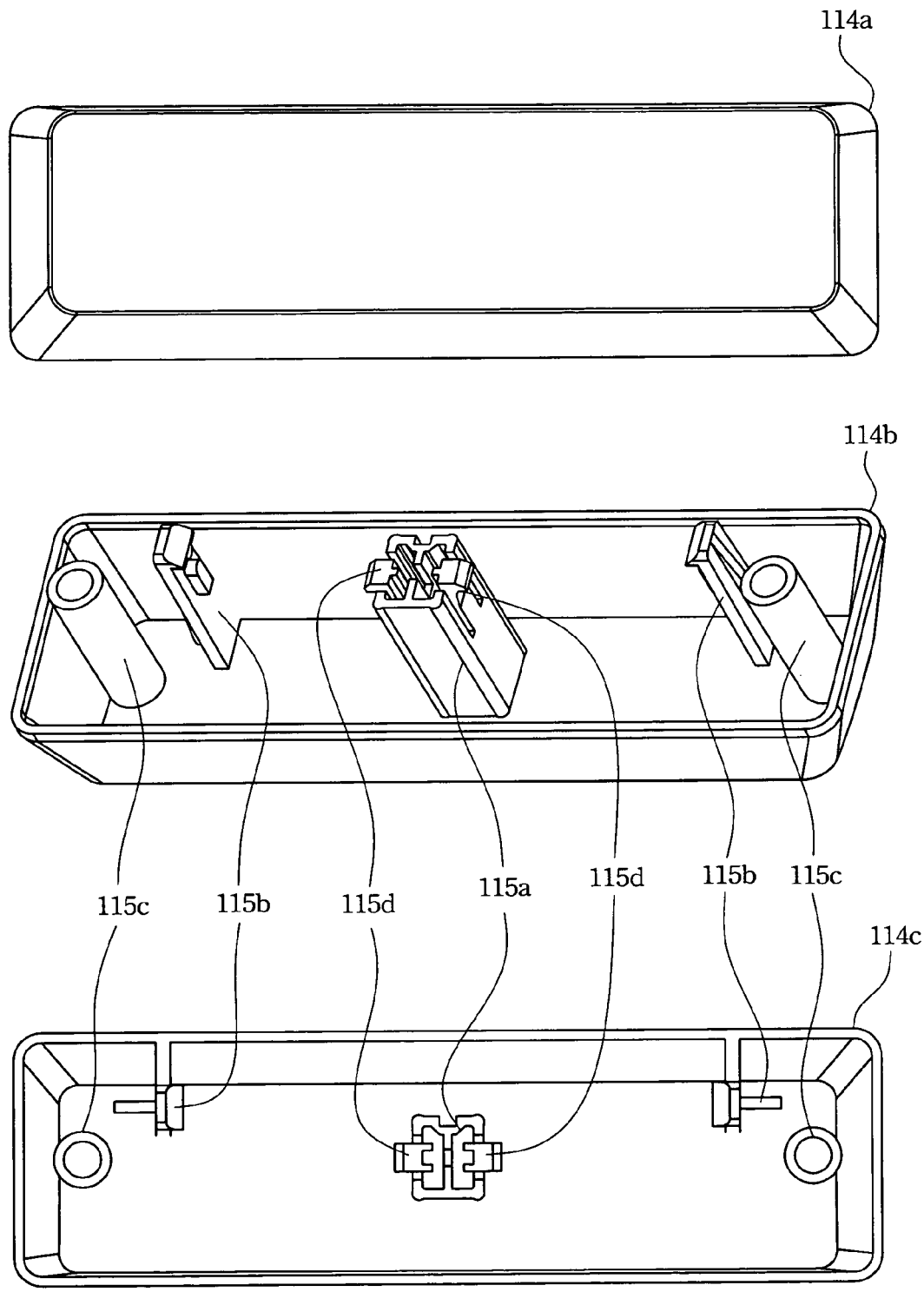
FIG. 6 illustrates a Japanese space key cap of a universal keyboard.
Figure 8:
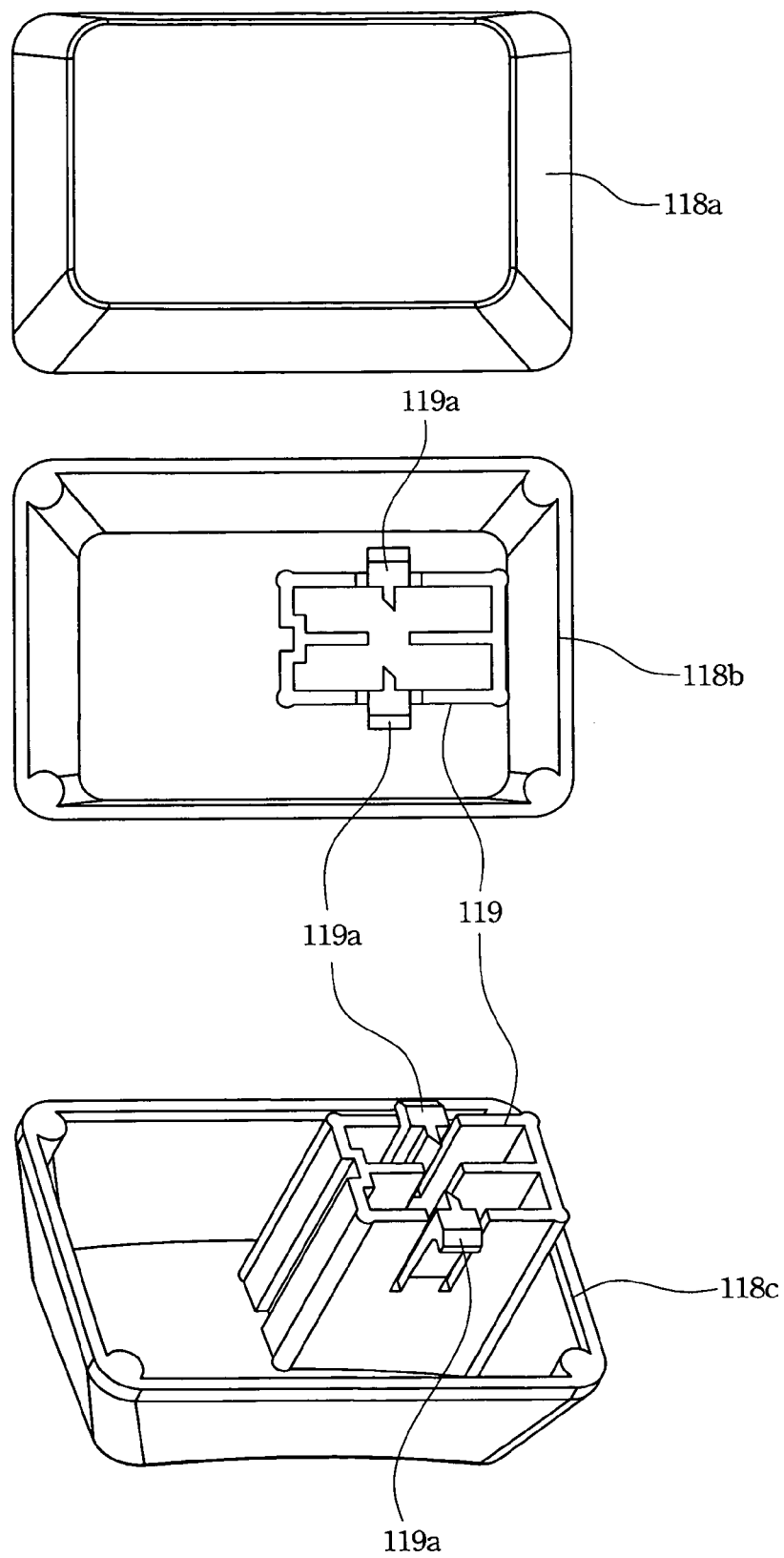
FIG. 8 illustrates a special Japanese key cap of a universal keyboard.

Please refer to FIG. 2, FIG. 4C FIG. 6 and FIG. 8, which illustrates how Japanese key caps are designed to be installed on the key hole row 202a of the universal upper housing 200. FIG. 4C illustrates a top view of the upper housing 200, where a balance rod 212 is added. FIG. 6 illustrates a top view 114a, a bottom view 114b and a side view 114c of the Japanese space key cap 114. FIG. 8 illustrates a top view 118a, a bottom view 118b and a side view 118c of the Japanese special key cap 118.

Referring to FIG. 6, the Japanese space key cap 114 has a main positioning pin 115a, a pair of balance rod hooks 115b and a pair of assist positioning pins 115c on its bottom surface. The main positioning pin 115a is located on a central area of the bottom surface. The pair of balance rod hooks 115b are symmetrically located at two opposite sides of the main positioning pin 115a. The pair of cylindrical assist positioning pins 115c are also symmetrically located at two opposite sides of the main positioning pin 115a.

Please refer to FIG. 4C and FIG. 6. When the Japanese space key cap 114 is installed on the key hole row 202a of the universal upper housing 200, the main positioning pin 115a is inserted into the space key hole 206, the pair of assist positioning pins 115c are respectively inserted into the assist holes 208a/208b, and the pair of balance rod hooks 115b respectively engage with two end portions 212a/212b of the balance rod 212. After the main positioning pin 115a is inserted into the space key hole 206, a pair of hooks 115d engage with an inner wall of the space key hole 206 to secure the Japanese space key cap 114 to the universal upper housing 200. The balance rod 212 and the pair of assist positioning pins 115c both result in a balanced action of the Japanese space key cap 114 pressed by a user.

Please refer to FIG. 4C and FIG. 8. When a Japanese special key cap 118 is installed on the key hole row 202a of the universal upper housing 200, a positioning pin 119 is inserted into the special key hole 204a or 204b, a pair of hooks 119a engage with an inner wall of the special key hole 204a or 204 to secure the Japanese special key cap 118 to the universal upper housing 200. The Japanese special key cap 118 has bigger positioning pin 119 (compared to main positioning pin of the space key cap), which results in a balanced action of the Japanese special key cap 118 pressed by a user.

Figure 7:
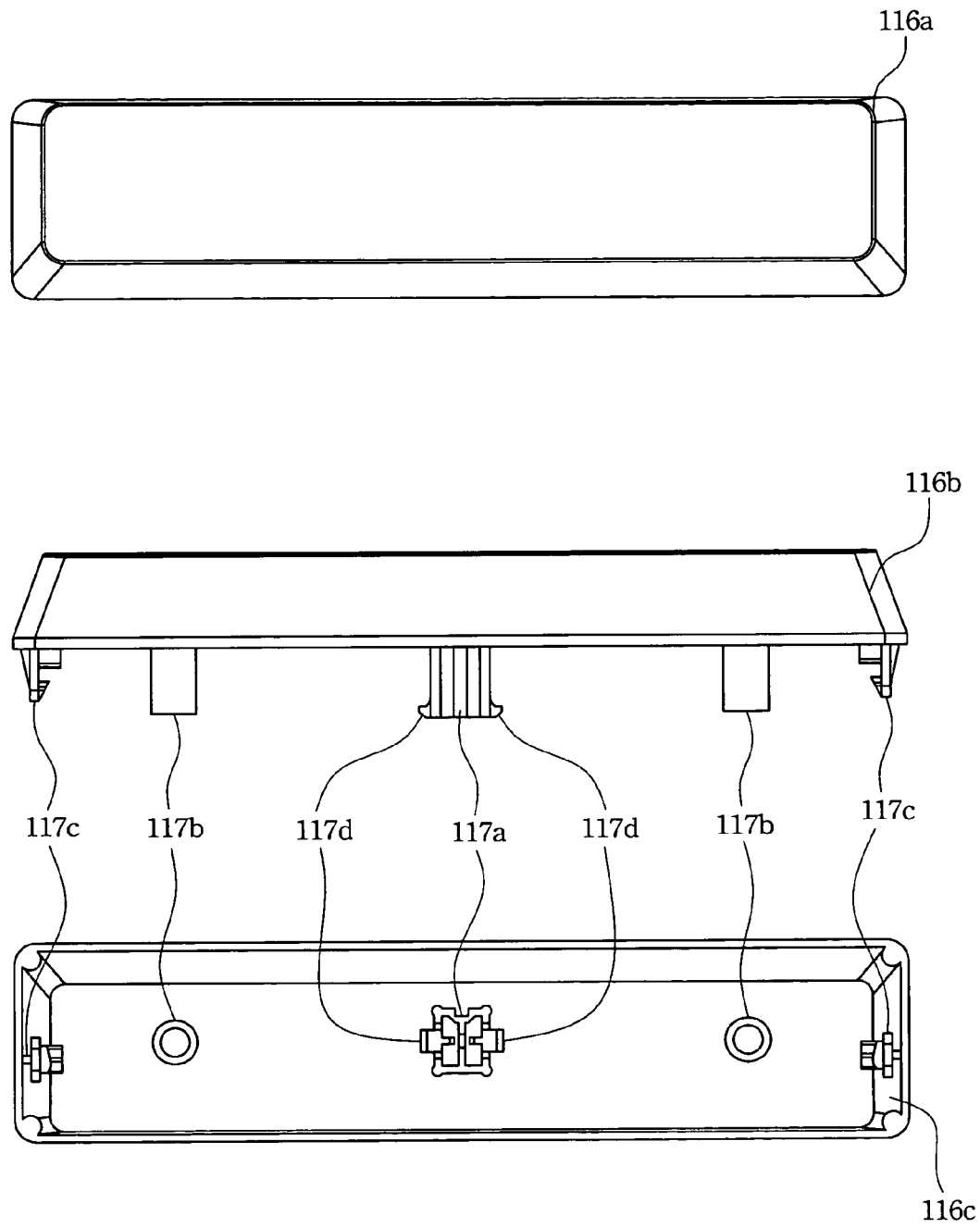
FIG. 7 illustrates a Korean space key cap of a universal keyboard.
Figure 9:
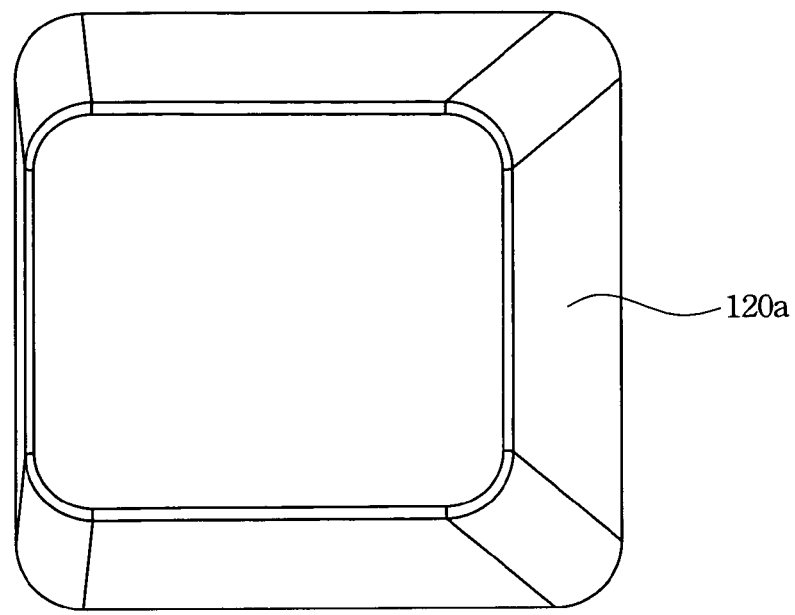
FIG. 9 illustrates a special Korean key cap of a universal keyboard.
Figure 9:
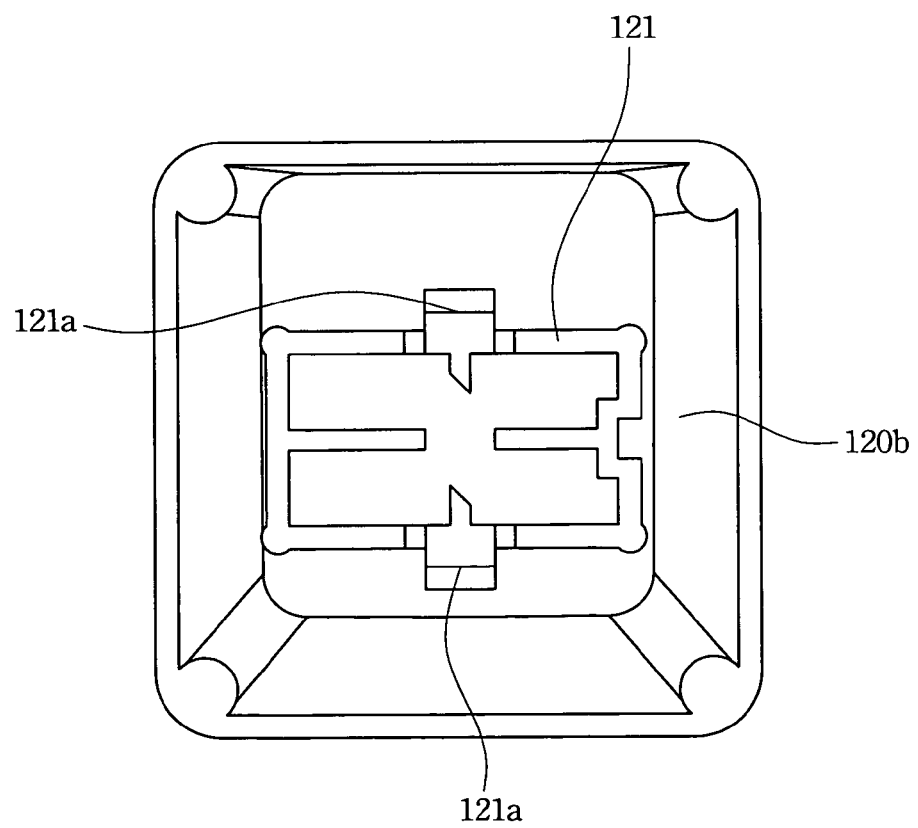

Please refer to FIG. 3, FIG. 4B, FIG. 7 and FIG. 9, which illustrates how Korean key caps are designed to be installed on the key hole row 202a of the universal upper housing 200. FIG. 4B illustrates a top view of the upper housing 200, where a balance rod 210 is added. FIG. 7 illustrates a top view 116a, a bottom view 116b and a side view 116c of the Korean space key cap 116. FIG. 9 illustrates a top view 120a and a bottom view 120b of the Korean special key cap 120.

Referring to FIG. 7, the Korean space key cap 116 has a main positioning pin 117a, a pair of balance rod hooks 117c and a pair of assist positioning pins 117b on its bottom surface. The main positioning pin 117a is located on a central area of the bottom surface. The pair of balance rod hooks 117c are symmetrically located at two opposite sides of the main positioning pin 117a. The pair of cylindrical assist positioning pins 117b are also symmetrically located at two opposite sides of the main positioning pin 117a (a width between two assist positioning pins 117b of the Korean space key cap 116 is equal to a width between two assist positioning pins 115c of the Japan space key cap 114).

Please refer to FIG. 4B and FIG. 7. When the Korean space key cap 116 is installed on the key hole row 202a of the universal upper housing 200, the main positioning pin 117a is inserted into the space key hole 206, the pair of assist positioning pins 117b are respectively inserted into the assist holes 208a/208b, and the pair of balance rod hooks 117c respectively engage with two end portions 210a/210b of the balance rod 210. After the main positioning pin 117a is inserted into the space key hole 206, a pair of hooks 117d engage with an inner wall of the space key hole 206 to secure the Korean space key cap 116 to the universal upper housing 200. The balance rod 210 and the pair of assist positioning pins 117b both result in a balanced action of the Korean space key cap 116 pressed by a user.

Please refer to FIG. 4B and FIG. 9. When a Korean special key cap 120 is installed on the key hole row 202a of the universal upper housing 200, a positioning pin 121 is inserted into the special key hole 204a or 204b, a pair of hooks 121a engage with an inner wall of the special key hole 204a or 204 to secure the Korean special key cap 120 to the universal upper housing 200. The Korean special key cap 120 has bigger positioning pin 121 (compared to main positioning pin of the space key cap), which results in a balance pressed action of the Korean special key cap 120 by a user. In addition, the positioning pin 121 of the Korean special key cap 120 is of the same size as the positioning pin 119 of the Japanese special key cap 118, such that both the positioning pin 121 and the positioning pin 119 can be both inserted into the special key hole 204a/204b.

According to embodiments discussed above, the universal keyboard has a universal upper housing for installing at least American, Japanese and Korean key caps, thereby reducing manufacturing costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A universal keyboard, comprising:
   an upper housing; and
   a major keypad area, on the upper housing, wherein the major keypad area has a key hole row comprising:
   a space key hole for installing a space key;
   a first and second special key holes, respectively disposed at two opposite sides of the space key hole;
   a first assist hole, disposed between the space key hole and the first special key hole; and
   a second assist hole, disposed between the space key hole and the second special key hole.

2. The universal keyboard of claim 1, wherein the major keypad area further comprises a plurality of standard key holes, each of which has the same diameter as the space key hole does.

3. The universal keyboard of claim 2, further comprising an American space key cap having a main positioning pin on a bottom surface thereof to be inserted into the space key hole.

4. The universal keyboard of claim 3, wherein the American space key cap further comprises a pair of assist positioning pins on the bottom surface thereof to be respectively inserted into the first special key hole and the second special key hole.

5. The universal keyboard of claim 4, wherein the assist positioning pin is a T-shaped assist positioning pin.

6. The universal keyboard of claim 2, further comprising a Japanese space key cap having a main positioning pin on a bottom surface thereof to be inserted into the space key hole.

7. The universal keyboard of claim 6, wherein the Japanese space key cap further comprises a pair of assist positioning pins on the bottom surface thereof to be respectively inserted into the first assist hole and the second assist hole.

8. The universal keyboard of claim 7, wherein the assist positioning pin is a cylindrical assist positioning pin.

9. The universal keyboard of claim 6, further comprising a special Japanese key cap having a positioning pin on a bottom surface thereof to be inserted into the first special key hole or the second special key hole.

10. The universal keyboard of claim 2, further comprising a Korean space key cap having a main positioning pin on a bottom surface thereof to be inserted into the space key hole.

11. The universal keyboard of claim 10, wherein the Korean space key cap further comprises a pair of assist positioning pins on the bottom surface thereof to be respectively inserted into the first assist hole and the second assist hole.

12. The universal keyboard of claim 11, wherein the assist positioning pin is a cylindrical assist positioning pin.

13. The universal keyboard of claim 10, further comprising a special Korean key cap having a positioning pin on a bottom surface thereof to be inserted into the first special key hole or the second special key hole.

14. The universal keyboard of claim 1, wherein the first special key hole has the same diameter as the second special key hole does, and the diameter of the first special key hole is larger than a diameter of the space key hole.

* * * * *